US008749565B2

(12) United States Patent
Bratt et al.

(10) Patent No.: US 8,749,565 B2
(45) Date of Patent: Jun. 10, 2014

(54) ERROR CHECK-ONLY MODE

(75) Inventors: Joseph P. Bratt, San Jose, CA (US); Peter F. Holland, Sunnyvale, CA (US); David L. Bowman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 805 days.

(21) Appl. No.: 12/950,239

(22) Filed: Nov. 19, 2010

(65) Prior Publication Data

US 2012/0127187 A1 May 24, 2012

(51) Int. Cl.
*G06T 1/60* (2006.01)

(52) U.S. Cl.
USPC .......... 345/530

(58) Field of Classification Search
USPC .......... 714/763, 746; 345/98
See application file for complete search history.

(56) References Cited

U.S. PATENT DOCUMENTS 6,768,774 B1 7/2004 MacInnis et al.
2003/0142058 A1* 7/2003 Maghielse .......... 345/98
2008/0222491 A1* 9/2008 Lee et al. .......... 714/763
2009/0271678 A1* 10/2009 Schneider et al. .......... 714/746
2010/0287427 A1* 11/2010 Kim et al. .......... 714/721
2012/0050462 A1* 3/2012 Liu et al. .......... 348/43

FOREIGN PATENT DOCUMENTS

JP 11110239 4/1999

* cited by examiner

*Primary Examiner* — Phi Hoang
(74) *Attorney, Agent, or Firm* — Lawrence J. Merkel; Meyertons, Hood, Kivlin, Kowert & Goetzel, P.C.

(57) ABSTRACT

Video display pipes may terminate with a FIFO (first-in first-out) buffer from which pixels are provided to a display controller to display the pixels on a graphics/video display. The display pipes may frequently process the pixels at a much higher rate than at which the display controller fetches the pixels from the FIFO buffer. In an error-checking only mode, the FIFO may be disabled, and an error-checking (e.g. CRC) block connected in front of the FIFO may receive the pixels processed by the display pipes as fast as the display pipes are capable of processing the pixels. Accordingly, the length of test/simulation time required to perform a test may be determined by the rate at which pixels are generated rather than the rate at which the display controller displays the pixels. It also becomes possible to perform testing/simulation in environments where a display is not supported or is not available. The results generated by the error-checking may be read and compared to an expected value to detect test pass/fail conditions.

21 Claims, 5 Drawing Sheets

ERROR CHECK-ONLY MODE

BACKGROUND

1. Field of the Invention

This invention is related to the field of graphical information processing, more particularly, to conversion from one color space to another.

2. Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically is made up of a specified number of pixels according to the resolution of the image/video frame. Information associated with a frame typically includes color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The color values can represent information corresponding to any one of a number of color spaces. Oftentimes, pixels that have been processed and/or rendered undergo error checking prior to being sent to a display, to ensure picture accuracy. One possible error checking mechanism is a cyclic redundancy check (CRC).

CRC can be used as a hash function to detect accidental changes to pixel data (pixel values) at the output of a display pipeline. A CRC calculation typically yields a short, fixed-length binary sequence—CRC code—for each specified set of pixel data. The CRC code can be transmitted or stored together with the specified set of pixel data. When a set of pixel data is read or received, the calculation may be repeated if the new CRC does not match the one calculated earlier, in which case the set contains a data error, requiring corrective action, which may include rereading the pixel data or requesting the set of pixel data to be sent again. If the CRC matches the one calculated earlier, the data is assumed to be error free. The check (data verification) code is a redundancy in that it does not increase the information content of the message, and the algorithm is based on cyclic codes. CRC may refer to the check code or the function that calculates it, typically accepting data streams of any length as input while outputting a fixed-length code. CRC error checking is generally simple to implement in binary hardware, is particularly effective at detecting common errors that result from transmission channel noise, and produces codes that are easy to analyze mathematically. Typically, an n-bit CRC, applied to a data set of arbitrary length, detects any single error burst that is not longer than n bits, and detects a fraction $1\text{-}2^{(-n)}$ of all longer error bursts.

While CRC offers an effective and relatively simple error checking mechanism, many systems require the error checking mechanism to be integrated without adversely affecting system performance, while also minimizing the duration of required tests/simulations that need to be performed on these systems. Other corresponding issues related to the prior art will become apparent to one skilled in the art after comparing such prior art with the present invention as described herein.

SUMMARY

In one set of embodiments, display pipes in a video system may terminate with an output FIFO (first-in first-out) buffer from which pixels are provided to a display controller coupled to a graphics/video display. The graphics/video display may display video/images represented by the pixels. The display pipes may frequently fill the FIFO buffer at a much higher rate than at which the display controller fetches the pixels from the FIFO buffer. An error-checking block, e.g., a CRC (cyclic redundancy check) block may be connected in front of the FIFOs to receive the pixels processed by the display pipes, in a manner similar to the FIFOs receiving the processed pixels. The display pipes may support an error-checking-only (ECO) mode of operation during which pixels may be generated as fast as the display pipes are capable of processing them. In this mode of operation, the output FIFOs may be disabled. As a result, the pixels are not written to the FIFO, which therefore does not fill up, but are instead processed directly by the error-checking block. Accordingly, the length of test/simulation time required to perform a test may be determined by the rate at which pixels are generated rather than the rate at which the display controller displays the pixels. Furthermore, this mode makes it possible to perform testing in environments where a display is not supported or is not available. The results generated by the error-checking may be read and compared to an expected value to detect test pass/fail conditions. Consequently, there is no need to connect a display controller/display to the FIFOs for testing and/or simulation purposes.

In one embodiment, a display pipe includes one or more processing blocks to process pixels and produce output pixels from the processed pixels, and further includes a buffer to store the output pixels for reading by a display controller during a first mode of operation. The buffer can be disabled to not store the output pixels during a second mode of operation. The display pipe further includes an error-checking block to receive the output pixels during the second mode of operation, and compute an error-checking value corresponding to the output pixels at a rate commensurate with a rate at which the one or more processing blocks process the pixels. The buffer may be a FIFO buffer, and the error-checking block may perform CRC calculations. The error-checking block may also compare the error-checking value to an expected value to detect test pass/fail conditions, where the pixels correspond to one or more image and/or video frames.

A video system may include a display pipe to generate pixels at a first clock rate, the generated pixels representing a frame. The video system may also include a FIFO buffer to receive and store the generated pixels when the FIFO buffer is enabled, and may further include a display controller to retrieve the stored generated pixels from the FIFO buffer at a second clock rate when the FIFO buffer is enabled. An error checking circuit in the video system may receive the generated pixels at the first clock rate when the FIFO buffer is disabled, and may compute an error checking value corresponding to the received generated pixels. In one set of embodiments, the display pipe may generate sets of pixels, each set of pixels representing a respective image/video frame. The error checking circuit may receive each set of pixels at the first clock rate when the FIFO buffer is disabled, and compute a respective error checking value corresponding to each received generated set of pixels. When the buffer is enabled, the display controller may provide the pixels it has retrieved from the FIFO buffer to a display device at the second clock rate, to display the retrieved pixels on the display device. The video system may also include a processing unit to retrieve the error-checking value from the error-checking circuit, and compare the error checking-value with an expected value to determine pass/fail conditions of the display pipe. The processing unit may also be used to enable and disable the FIFO buffer.

In one set of embodiments, a system may include a system memory to store visual information represented by a set of pixels. A display pipe may fetch the set of pixels from the system memory, process the set of pixels to generate a stream of pixels, and output the stream of pixels. A FIFO buffer may receive and store the stream of pixels output by the display pipe, while a display controller may read the stream of pixels from the FIFO buffer and provide them to a display device configured to display the visual information represented by the stream of pixels. The display controller may read the stream of pixels from the FIFO buffer at a rate commensurate with a refresh rate of the display device. The system may also include an error checking circuit to receive the stream of pixels output by the display pipe at a rate at which the display pipe processes the set of pixels, and compute an error-checking value based on the received stream of pixels. A processing unit coupled to the display pipe may be used to disable the FIFO buffer to allow the display pipe to output the stream of pixels at the rate at which the display pipe processes the set of pixels. The processing unit may also be used to provide an expected value to the error-checking unit, and the error-checking unit comparing the error-checking value with the expected value to determine a pass/fail condition of the display pipe.

BRIEF DESCRIPTION OF THE DRAWINGS

The following detailed description makes reference to the accompanying drawings, which are now briefly described.

Figure 1:
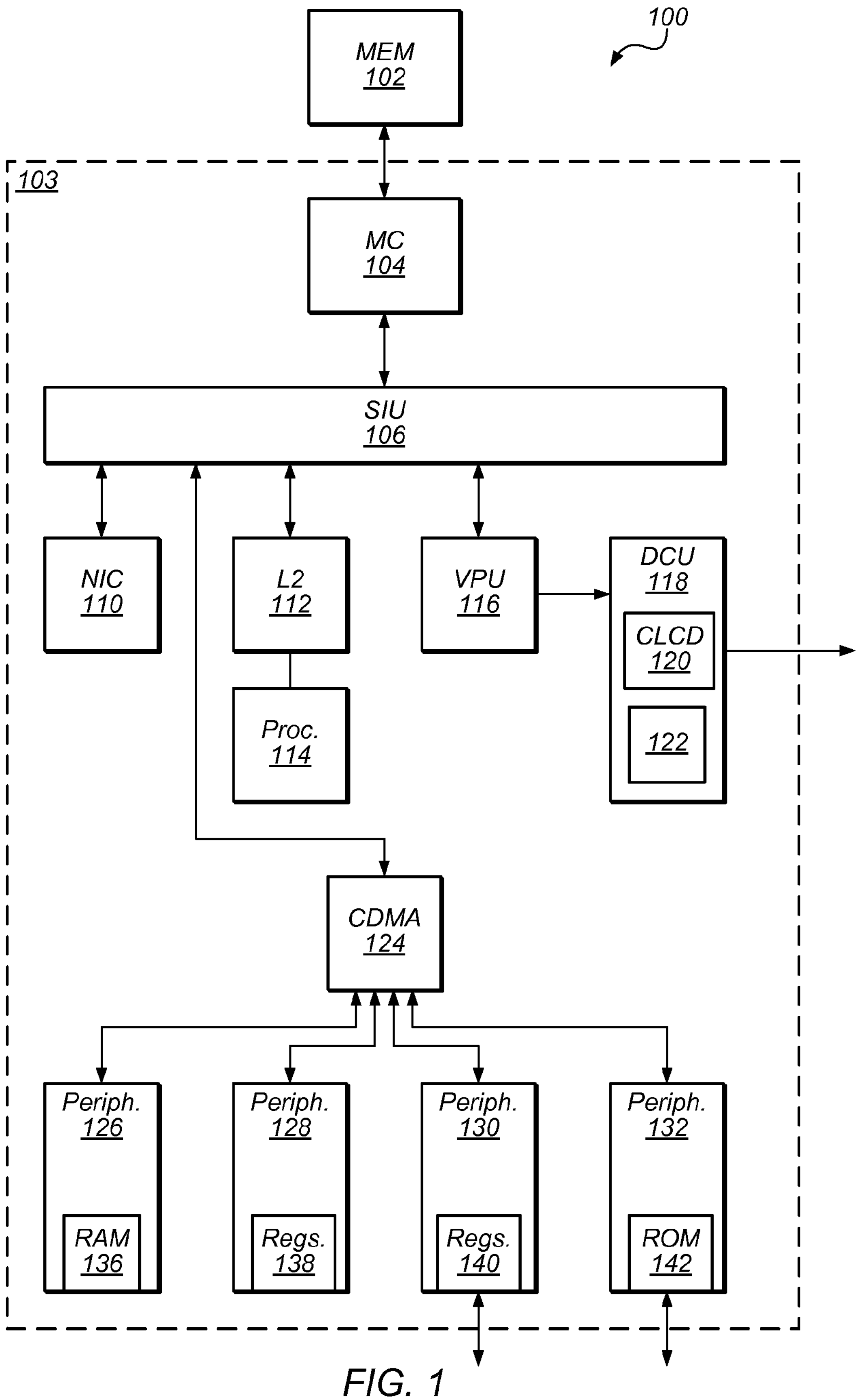
FIG. 1 is a block diagram of one embodiment of an integrated circuit that include a graphics display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 100 that includes an integrated circuit 103 coupled to external memory 102 is shown. In the illustrated embodiment, integrated circuit 103 includes a memory controller 104, a system interface unit (SIU) 106, a set of peripheral components such as components 126-128, a central DMA (CDMA) controller 124, a network interface controller (NIC) 110, a processor 114 with a level 2 (L2) cache 112, and a video processing unit (VPU) 116 coupled to a display control unit (DCU) 118. One or more of the peripheral components may include memories, such as random access memory (RAM) 136 in peripheral component 126 and read-only memory (ROM) 142 in peripheral component 132. One or more peripheral components 126-132 may also include registers (e.g. registers 138 in peripheral component 128 and registers 140 in peripheral component 130 in FIG. 1). Memory controller 104 is coupled to a memory interface, which may couple to memory 102, and is also coupled to SIU 106. CDMA controller 124, and L2 cache 112 are also coupled to SIU 106 in the illustrated embodiment. L2 cache 112 is coupled to processor 114, and CDMA controller 124 is coupled to peripheral components 126-132. One or more peripheral components 126-132, such as peripheral components 140 and 142, may be coupled to external interfaces as well.

SIU 106 may be an interconnect over which the memory controller 104, peripheral components NIC 110 and VPU 116, processor 114 (through L2 cache 112), L2 cache 112, and CDMA controller 124 may communicate. SIU 106 may implement any type of interconnect (e.g. a bus, a packet interface, point to point links, etc.). SIU 106 may be a hierarchy of interconnects, in some embodiments. CDMA controller 124 may be configured to perform DMA operations between memory 102 and/or various peripheral components 126-132. NIC 110 and VPU 116 may be coupled to SIU 106 directly and may perform their own data transfers to/from memory 102, as needed. NIC 110 and VPU 116 may include their own DMA controllers, for example. In other embodiments, NIC 110 and VPU 116 may also perform transfers through CDMA controller 124. Various embodiments may include any number of peripheral components coupled through the CDMA controller 124 and/or directly to the SIU 106. DCU 118 may include a display control unit (CLDC) 120 and buffers/registers 122. CLDC 120 may provide image/video data to a display, such as a liquid crystal display (LCD), for example. DCU 118 may receive the image/video data from VPU 116, which may obtain image/video frame information from memory 102 as required, to produce the image/video data for display, provided to DCU 118.

Processor 114 (and more particularly, instructions executed by processor 114) may program CDMA controller 124 to perform DMA operations. Various embodiments may program CDMA controller 124 in various ways. For example, DMA descriptors may be written to the memory 102, describing the DMA operations to be performed, and CDMA controller 124 may include registers that are programmable to locate the DMA descriptors in the memory 102. The DMA descriptors may include data indicating the source and target of the DMA operation, where the DMA operation transfers data from the source to the target. The size of the DMA transfer (e.g. number of bytes) may be indicated in the descriptor. Termination handling (e.g. interrupt the processor, write the descriptor to indicate termination, etc.) may be specified in the descriptor. Multiple descriptors may be created for a DMA channel, and the DMA operations described in the descriptors may be performed as specified. Alternatively, the CDMA controller 124 may include registers that are programmable to describe the DMA operations to be performed, and programming the CDMA controller 124 may include writing the registers.

Generally, a DMA operation may be a transfer of data from a source to a target that is performed by hardware separate from a processor that executes instructions. The hardware may be programmed using instructions executed by the processor, but the transfer itself is performed by the hardware independent of instruction execution in the processor. At least one of the source and target may be a memory. The memory may be the system memory (e.g. the memory 102), or may be an internal memory in the integrated circuit 103, in some embodiments. For example, a peripheral component 126-132 may include a memory that may be a source or target. In the illustrated embodiment, peripheral component 132 includes the ROM 142 that may be a source of a DMA operation. Some DMA operations may have memory as a source and a target (e.g. a first memory region in memory 102 may store the data to be transferred and a second memory region may be the target to which the data may be transferred). Such DMA operations may be referred to as "memory-to-memory" DMA operations or copy operations. Other DMA operations may have a peripheral component as a source or target. The peripheral component may be coupled to an external interface on which the DMA data is to be transferred or on which the DMA data is to be received. For example, peripheral components 130 and 132 may be coupled to interfaces onto which DMA data is to be transferred or on which the DMA data is to be received.

CDMA controller 124 may support multiple DMA channels. Each DMA channel may be programmable to perform a DMA via a descriptor, and the DMA operations on the DMA channels may proceed in parallel. Generally, a DMA channel may be a logical transfer path from a source to a target. Each channel may be logically independent of other DMA channels. That is, the transfer of data on one channel may not logically depend on the transfer of data on another channel. If two or more DMA channels are programmed with DMA operations, CDMA controller 124 may be configured to perform the transfers concurrently. For example, CDMA controller 124 may alternate reading portions of the data from the source of each DMA operation and writing the portions to the targets. CDMA controller 124 may transfer a cache block of data at a time, alternating channels between cache blocks, or may transfer other sizes such as a word (e.g. 4 bytes or 8 bytes) at a time and alternate between words. Any mechanism for supporting multiple DMA operations proceeding concurrently may be used.

CDMA controller 124 may include buffers to store data that is being transferred from a source to a destination, although the buffers may only be used for transitory storage. Thus, a DMA operation may include CDMA controller 124 reading data from the source and writing data to the destination. The data may thus flow through the CDMA controller 124 as part of the DMA operation. Particularly, DMA data for a DMA read from memory 124 may flow through memory controller 104, over SIU 106, through CDMA controller 124, to peripheral components 126-132, NIC 110, and VPU 116 (and possibly on the interface to which the peripheral component is coupled, if applicable). Data for a DMA write to memory may flow in the opposite direction. DMA read/write operations to internal memories may flow from peripheral components 126-132, NIC 110, and VPU 116 over SIU 106 as needed, through CDMA controller 124, to the other peripheral components (including NIC 110 and VPU 116) that may be involved in the DMA operation.

In one embodiment, instructions executed by the processor 114 may also communicate with one or more of peripheral components 126-132, NIC 110, VPU 116, and/or the various memories such as memory 102, or ROM 142 using read and/or write operations referred to as programmed input/output (PIO) operations. The PIO operations may have an address that is mapped by integrated circuit 103 to a peripheral component 126-132, NIC 110, or VPU 116 (and more particularly, to a register or other readable/writeable resource, such as ROM 142 or Registers 138 in the component, for example). It should also be noted, that while not explicitly shown in FIG. 1, NIC 110 and VPU 116 may also include registers or other readable/writeable resources which may be involved in PIO operations. PIO operations directed to memory 102 may have an address that is mapped by integrated circuit 103 to memory 102. Alternatively, the PIO operation may be transmitted by processor 114 in a fashion that is distinguishable from memory read/write operations (e.g. using a different command encoding then memory read/write operations on SIU 106, using a sideband signal or control signal to indicate memory vs. PIO, etc.). The PIO transmission may still include the address, which may identify the peripheral component 126-132, NIC 110, or VPU 116 (and the addressed resource) or memory 102 within a PIO address space, for such implementations.

In one embodiment, PIO operations may use the same interconnect as CDMA controller 124, and may flow through CDMA controller 124, for peripheral components that are coupled to CDMA controller 124. Thus, a PIO operation may be issued by processor 114 onto SIU 106 (through L2 cache 112, in this embodiment), to CDMA controller 124, and to the targeted peripheral component. Alternatively, the peripheral components 126-132 may be coupled to SIU 106 (much like NIC 110 and VPU 116) for PIO communications. PIO operations to peripheral components 126-132 may flow to the components directly from SIU 106 (i.e. not through CDMA controller 124) in one embodiment.

Generally, a peripheral component may comprise any desired circuitry to be included on integrated circuit 103 with the processor. A peripheral component may have a defined functionality and interface by which other components of integrated circuit 103 may communicate with the peripheral component. For example, a peripheral component such as VPU 116 may include video components such as a display pipe, which may include graphics processors, and a peripheral such as DCU 118 may include other video components such as display controller circuitry. NIC 110 may include networking components such as an Ethernet media access controller (MAC) or a wireless fidelity (WiFi) controller. Other peripherals may include audio components such as digital signal processors, mixers, etc., controllers to communicate on various interfaces such as universal serial bus (USB), peripheral component interconnect (PCI) or its variants such as PCI express (PCIe), serial peripheral interface (SPI), flash memory interface, etc.

As mentioned previously, one or more of the peripheral components 126-132, NIC 110 and VPU 116 may include registers (e.g. registers 138-140 as shown, but also registers, not shown, in NIC 110 and/or within VPU 116) that may be addressable via PIO operations. The registers may include configuration registers that configure programmable options of the peripheral components (e.g. programmable options for video and image processing in VPU 116), status registers that may be read to indicate status of the peripheral components, etc. Similarly, peripheral components may include memories such as ROM 142. ROMs may store data used by the peripheral that does not change, code to be executed by an embedded processor within the peripheral component 126-132, etc.

Memory controller 104 may be configured to receive memory requests from system interface unit 106. Memory controller 104 may be configured to access memory to complete the requests (writing received data to the memory for a write request, or providing data from memory 102 in response to a read request) using the interface defined the attached memory 102. Memory controller 104 may be configured to interface with any type of memory 102, such as dynamic random access memory (DRAM), synchronous DRAM (SDRAM), double data rate (DDR, DDR2, DDR3, etc.) SDRAM, Low Power DDR2 (LPDDR2) SDRAM, RAMBUS DRAM (RDRAM), static RAM (SRAM), etc. The memory may be arranged as multiple banks of memory, such as dual inline memory modules (DIMMs), single inline memory modules (SIMMs), etc. In one embodiment, one or more memory chips are attached to the integrated circuit 10 in a package on package (POP) or chip-on-chip (COC) configuration.

It is noted that other embodiments may include other combinations of components, including subsets or supersets of the components shown in FIG. 1 and/or other components. While one instance of a given component may be shown in FIG. 1, other embodiments may include one or more instances of the given component.

Figure 2:
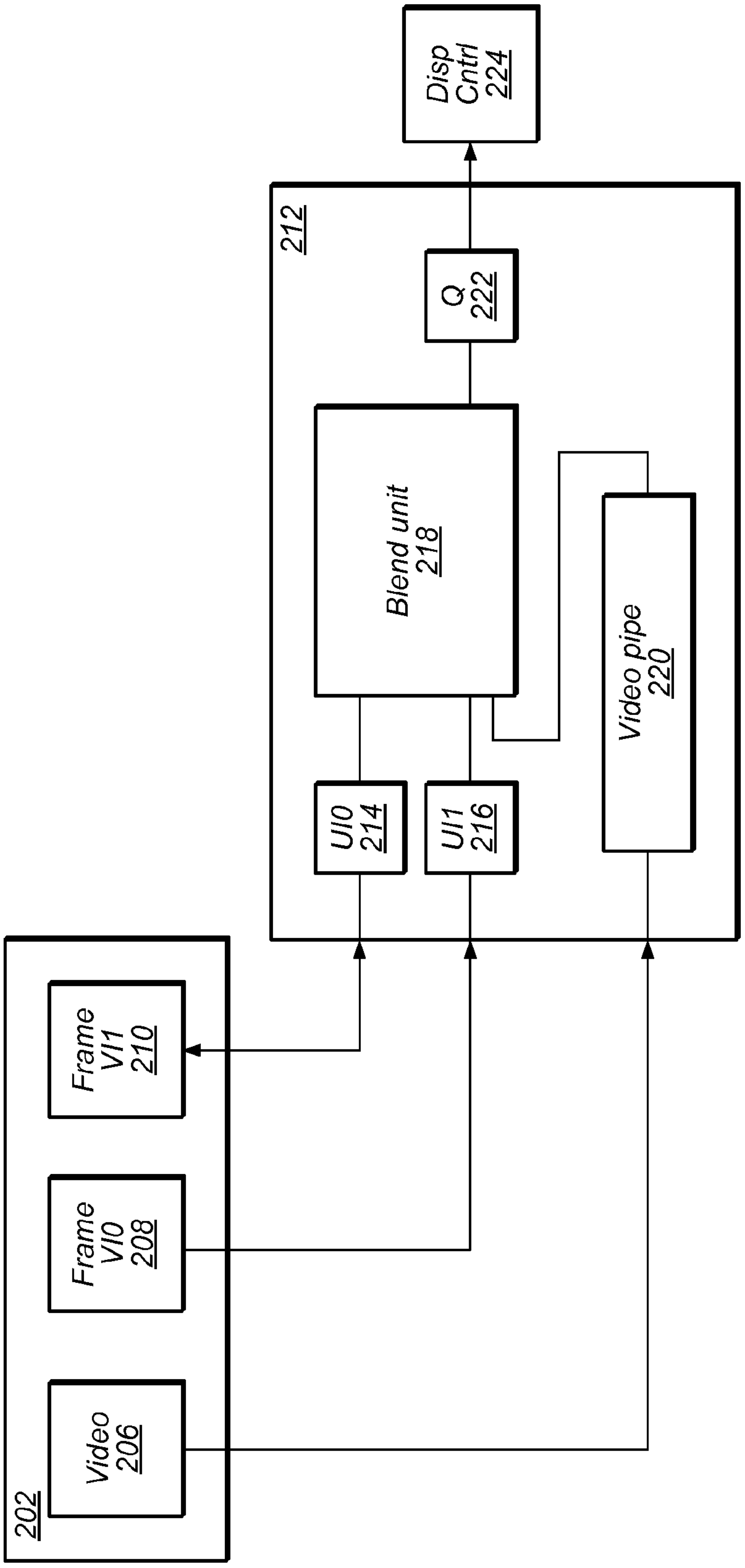
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. In some embodiments, the video frames/information stored in video buffer 206 may be represented in a first color space, according the origin of the video information. For example, the video information may be represented in the YCbCr color space. At the same time, the image frame information stored in image frame buffers 208 and 210 may be represented in a second color space, according to the preferred operating mode of display pipe 212. For example, the image frame information stored in image frame buffers 208 and 210 may be represented in the RGB color space. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. UI 214 and 216, and video pipe 220 may respectively provide the fetched image frame information and video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define at least one active region per frame stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
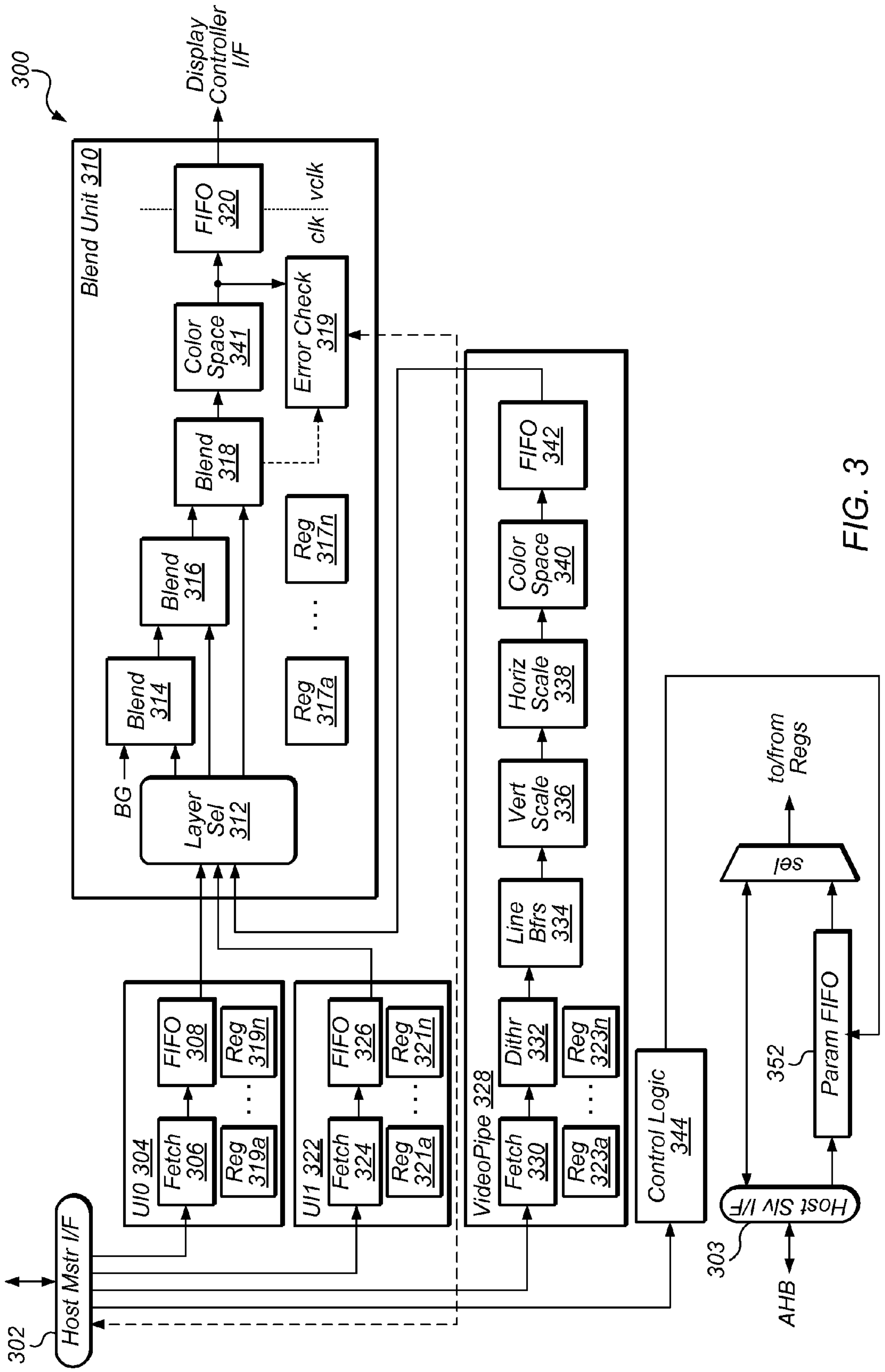
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data, which may be represented in a first color space, likely the YCbCr color space, may be dithered, scaled, converted to a second color space (for example the RGB color space) for use in blend unit 310, and blended with up to a specified number (e.g. 2) of graphics (user interface) planes that are also represented in the second (i.e. RGB) color space. Display pipe 300 may run in its own clock domain, and may provide an asynchronous interface to the display controllers to support displays of different sizes and timing requirements. Display pipe 300 may include one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319*a*-319*n* and 321*a*-321*n*, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. As previously mentioned, the pixel values may be represented in the color space designated as the operating color space of the blend unit, in this case the RGB color space. In one set of embodiments, fetch units 306 and 324 may only fetch those pixels of any given frame that are within the active region of the given frame, as defined by the contents of registers 319*a*-319*n* and 321*a*-321*n*. The fetched pixels may be fed to respective FIFO buffers 308 and 326, from which the UI units may provide the fetched pixels to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD. In one set of embodiments, the output frame(s) may be converted back to the original color space of the video information, e.g. to the YCbCr color space, to be displayed on the display of choice, The overall operation of blend unit 310 will now be described. Blend unit 310 may be situated at the backend of display pipe 300 as shown in FIG. 3. It may receive frames of pixels represented in a second color space (e.g. RGB) from UI 304 and 322, and pixels represented in a first color space (e.g. YCbCr) from video pipe 328, and may blend them together layer by layer, through layer select unit 312, once the pixels obtained from video pipe 328 have been converted to the second color space, as will be further described below. The final resultant pixels (which may be RGB of 10-bits each) may be converted to the first color space through color space converter unit 341 (as will also be further described below), queued up in output FIFO 320 at the video pipe's clock rate of clk, and fetched by a display controller at the display controller's clock rate of vclk. It should be noted that while FIFO 320 is shown inside blend unit 310, alternate embodiments may position FIFO 320 outside blend unit 310 and possibly within a display controller unit.

The sources to blend unit 310 (UI 304 and 326, and/or video pipe 328) may provide the pixel data and per-pixel Alpha values (which may be 8-bit and define the transparency for the given pixel) for an entire frame with width, display width, and height, display height, in pixels starting at a specified default pixel location, (e.g. 0,0). The Alpha values may be used to perform per-pixel blending, may be overridden with a static per-frame Alpha value (e.g. saturated Alpha), or may be combined with a static per-frame Alpha value (e.g. Dissolve Alpha). Any pixel locations outside of a source's valid region may not be used in the blending. The layer underneath it may show through as if that pixel location had an Alpha of zero. An Alpha of zero for a given pixel may indicate that the given pixel is invisible, and will not be displayed.

Blend unit 310 may functionally operate on a single layer at a time. The lowest level layer may be defined as the background color (BG, provided to blend element 314). Layer 1 may blend with layer 0 (at blend element 316). The next layer, layer 2, may blend with the output from blend element 316 (at blend element 318), and so on until all the layers are blended. For the sake of simplicity, only three blend elements 314-318 are shown, but display pipe 300 may include more or less blend elements depending on the desired number of processed layers. Each layer (starting with layer 1) may specify where its source comes from to ensure that any source may be programmatically selected to be on any layer. As mentioned above, as shown, blend unit 310 has three sources (UI 304 and 322, and video pipe 328) to be selected onto three layers (using blend elements 314-318).

A CRC (cyclic redundancy check) may also be performed on the output of blend unit 310. For example, in a first mode of operation, such as a test mode, blend unit 310 may be put into an error-checking only mode, (e.g. a CRC only mode), when an error checking operation is performed on the output pixels without the output pixels being sent to the display controller. More specifically, the error checking operation may be performed on the pixel stream output from color space converter 341 (or, in some embodiments, output from blend element 318) without the pixel stream being provided to FIFO 320. In the embodiment shown, an error check unit 319 is coupled to the output of color space converter 341, to receive the pixel stream output by the display pipe. It should be noted that for ease of illustration, certain elements are shown in FIG. 3 as being included in blend unit 310. However, for ease of isolating the functionality of the display pipe as relating to the processing of pixels received through host interface 302, the output of display pipe 300 may be considered the output of color space converter 341 (if required), or alternately, the output of blend element 318. The pixel stream output by the display pipe may then be provided to FIFO 320 and/or error check unit 319. The dashed line from blend element 318 to error check circuit 319 indicates that error check circuit 319 may either/or also receive the pixel stream, depending on whether color space conversion (using color space elements 340 and 341) is required. The error checking functionality of error check element 319 may be performed on any stream of pixels received by error check unit 319, assuming that expected values for each given check are clearly specified/obtained.

As also previously mentioned, the stream of pixels output by display pipe 300 may be presented to an external display controller through asynchronous FIFO 320, and as the pixels are processed at a first rate—e.g. corresponding to a clock rate indicated as "clk" in FIG. 3—and pushed into FIFO 320, the display controller may issue signals to remove the pixels at a second rate—e.g. the display controller's clock frequency indicated as vclk in FIG. 3. In many cases the rate (corresponding to vclk) at which the pixels are removed, or popped from FIFO 320 will be lower than the rate (corresponding to clk) at which display pipe 300 processes the pixels. Therefore, the overall rate at which FIFO 320 is filled may not coincide with the rate at which display pipe 300 processes the pixels, since display pipe 300 may not be able to push more pixels into FIFO 320 once FIFO 320 is full. When placed in a test-only mode, for example via processing unit 114 shown in FIG. 1, FIFO 320 may be disabled, and the stream of pixels generated by display pipe 300 may be provided to error check unit 319 at a rate at which the pixels are processed. Since FIFO 320 does not fill up as neither blend element 318 nor color space converter 341 is pushing pixels into FIFO 320 when in test-only mode, error-check value(s) may be calculated by error check unit 319 at a higher rate than the rate at which pixels are typically read from FIFO 320 by a display controller.

As indicated above, error check unit 319 may be used to perform CRC operations based on the stream of pixels received from either blend element 318 or color space converter 341 (both of which may correspond to the output of the display pipe from an error checking perspective). By performing a CRC on the output pixels, no display controller and/or display is required to be connected to the output of FIFO 320 to perform test operations or simulations of the operation of display pipe 300. Furthermore, operation of display pipe 300 may be tested and/or simulated at the pixel generation rate rather than the pixel display rate. Error check unit 319 may perform a CRC for each frame. That is, the CRC value may be calculated for a stream of pixels representing a frame, and error check unit 319 may be polled every frame, for example by processing unit 114 shown in FIG. 1, to compare the CRC value with an expected value to detect pass/fail conditions. Alternately, processing unit 114 may provide the expected values to error check unit 319, or error check unit 319 may be designed to perform all the necessary CRC (or more generally, error) calculations required for testing/simulating operation of display pipe 300.

In one set of embodiments, valid source regions, referred to as active regions may be defined as the area within a frame that contains valid pixel data. Pixel data for an active region may be fetched from memory by UI 304 and 322, and stored within FIFOs 308 and 326, respectively. An active region may be specified by starting and ending (X,Y) offsets from an upper left corner (0,0) of the entire frame. The starting offsets may define the upper left corner of the active region, and the ending offsets may define the pixel location after the lower right corner of the active region. Any pixel at a location with coordinates greater than or equal to the starting offset and less than the ending offset may be considered to be in the valid region. Any number of active regions may be specified. For example, in one set of embodiments there may be up to four active regions defined within each frame and may be specified by region enable bits. The starting and ending offsets may be aligned to any pixel location. An entire frame containing the active regions may be sent to blend unit 310. Any pixels in the frame, but not in any active region would not be displayed, and may therefore not participate in the blending operation, as if the pixels outside of the active had an Alpha value of zero. In alternate embodiments, blend unit 310 may be designed to receive pixel data for only the active regions of the frame instead of receiving the entire frame, and automatically treat the areas within the frame for which it did not receive pixels as if it had received pixels having a blending value (Alpha value) of zero.

In one set of embodiments, one active region may be defined within UI 304 (in registers 319*a*-319*n*) and/or within UI 322 (in registers 321*a*-321*n*), and may be relocated within the display destination frame. Similar to how active regions within a frame may be defined, the frame may be defined by the pixel and addressing formats, but only one active region may be specified. This active region may be relocated within the destination frame by providing an X and Y pixel offset within that frame. The one active region and the destination position may be aligned to any pixel location. It should be noted that other embodiments may equally include a combination of multiple active regions being specified by storing information defining the multiple active regions in registers 319*a*-319*n* and in registers 321*a*-321*n*, and designating one or more of these active regions as active regions that may be relocated within the destination frame as described above.

In one set of embodiments, a parameter FIFO 352 may be used to store programming information for registers 319*a*-319*n*, 321*a*-321*n*, 317*a*-317*n*, and 323*a*-323*n*. Parameter FIFO 352 may be filled with this programming information by control logic 344, which may obtain the programming information from memory through host master interface 302. In some embodiments, parameter FIFO 352 may also be filled with the programming information through an advanced high-performance bus (AHB) via host slave interface 303.

Figure 4:
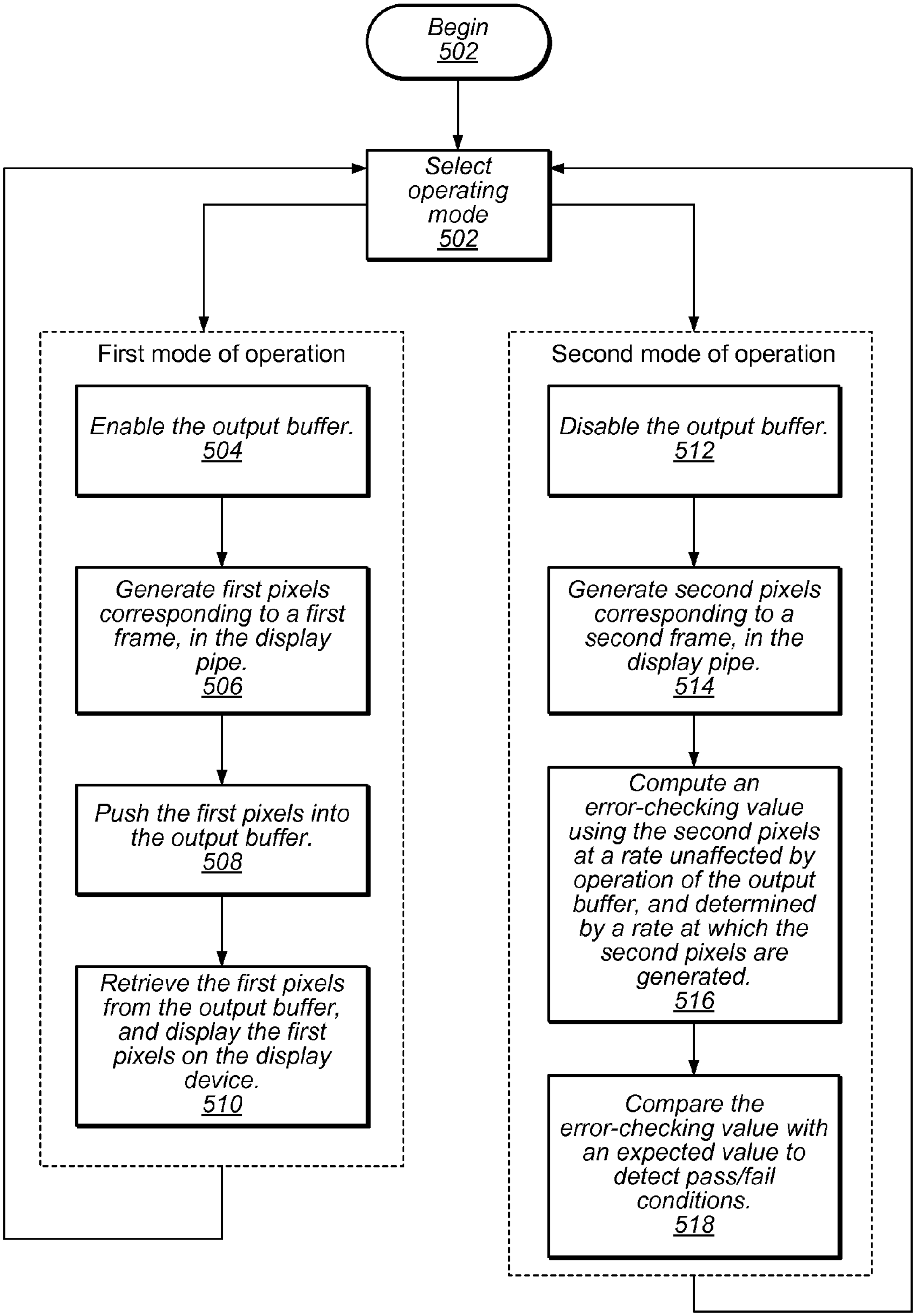
FIG. 4 is a flow chart illustrating one embodiment of a method for operating a video system.

Turning now to FIG. 4, a flowchart is shown illustrating one embodiment of a method for operating a video system. One of two operating modes may be selected (502). In a first operating mode, (or in a first mode of operation), an output buffer may be enabled (504), and first pixels corresponding to a first frame may be generated in a display pipe (506). The first pixels may then be pushed into the output buffer (508), and retrieved from the output buffer and displayed on a display device (510). In a second operating mode (or in a second mode of operation), the output buffer may be disabled (512), and second pixels corresponding to a second frame may be generated in the display pipe (514). An error-checking value may then be computed using the second pixels at a rate unaffected by operation of the output buffer, and determined by a rate at which the second pixels are generated (516). The error-checking value may be compared with an expected value to detect pass/fail conditions of the display pipe (518). The second mode of operation may correspond to an error-check only operation, and may be selected before selecting the first mode of operation, which may correspond to a graphics display operation during which graphics and/or video content is displayed on a display screen. In one set of embodiments, in the second mode of operation, a plurality of pixels corresponding to a plurality of frames may be generated in the display pipe (e.g. in 514), and a respective error checking value corresponding to each of the plurality of frames may be computed using the plurality of pixels at a rate unaffected by operation of the buffer, and determined by a rate at which the plurality of pixels are generated (e.g. in 516). Subsequently, each respective error value may be compared with a corresponding expected value to detect test pass/fail conditions (e.g. in 518). For testing purposes, in some embodiments, the first frame and the second frame may be the same, that is, the pixels generated in the second mode of operation (or during the test) may correspond to actual frames intended to be displayed in the first mode (or regular mode) of operation.

Figure 5:
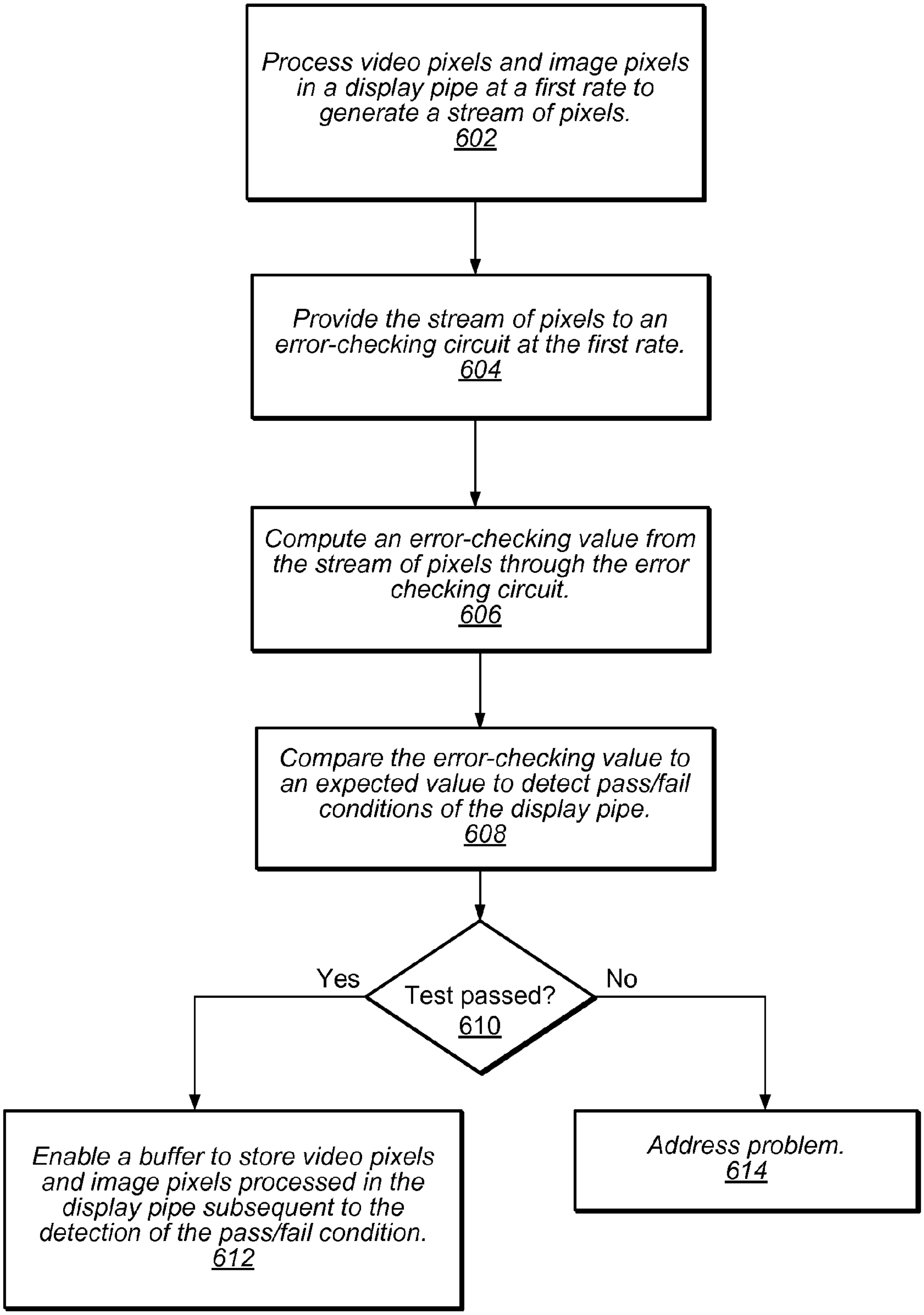
FIG. 5 is a flow chart illustrating one embodiment of a method for testing the functionality and operation of a display pipe.

Turning now to FIG. 5, a flowchart is shown illustrating operation of how some functionality of a display pipe may be tested according to one embodiment. Video pixels and image pixels may be processed in a display pipe (e.g. display pipe 300 in FIG. 3) at a first rate (e.g. a rate corresponding to "clk" indicated in FIG. 3) to generate a stream of pixels (602). The stream of pixels may be provided to an error-checking circuit (e.g. circuit 319 in FIG. 3) at the first rate (604), and the error-checking circuit may compute an error-checking value from the stream of pixels (606). Subsequently, the error-checking value may be compared with an expected value to detect pass/fail conditions of the display pipe (608). The condition may be evaluated (610), and in response to detecting a pass condition ("Yes" branch from 610), an output buffer (e.g. FIFO 320 in FIG. 3) may be enabled to store video pixels and image pixels processed in the display pipe subsequent to the detection of the pass/fail condition, that is, video pixels and image pixels processed in the display pipe subsequent to 608 (612). In response to detecting a fail condition ("No" branch from 610), the display pipe may be further examined and/or potential problems with the display pipe may be addressed. In some cases it may be possible that there is a hardware error and the display pipe may not function properly. In response to encountering the pass condition, a display controller may read the stored video pixels and image pixels from the buffer, and provide the stored video pixels and image pixels to a display device to display the stored video pixels and image pixels on the display device.

Numerous variations and modifications will become apparent to those skilled in the art once the above disclosure is fully appreciated. It is intended that the following claims be interpreted to embrace all such variations and modifications.

We claim:

1. A graphics processing display pipe comprising:

one or more processing blocks configured to process pixels and produce output pixels from the processed pixels;

a buffer configured to:

store the output pixels for reading by a display controller during a first mode of operation of the display pipe; and not store the output pixels during a second mode of operation of the display pipe; and an error-checking block configured to receive the output pixels during the second mode of operation, and compute an error-checking value corresponding to the output pixels during the second mode of operation at a rate commensurate with a rate at which the one or more processing blocks process the pixels;

wherein during the first mode of operation of the display pipe, the buffer is enabled to allow the buffer to receive and store the output pixels produced by the one or more processing blocks; and wherein during the second mode of operation of the display pipe the buffer is disabled to allow the error-checking block to receive the output pixels at a rate at which the one or more processing block as producing the output pixels.

2. The display pipe as recited in claim 1, wherein the buffer is a first-in-first-out (FIFO) buffer.

3. The display pipe as recited in claim 1, wherein the error-checking block is configured to perform cyclic redundancy check (CRC) operations.

4. The display pipe as recited in claim 1, wherein the pixels correspond to one or more frames, wherein each of the one or more frames is one of:

an image frame; and a video frame.

5. A video system comprising:

a display pipe configured to generate pixels at a first clock rate, wherein the generated pixels represent a frame;

a first-in-first-out (FIFO) buffer configured to receive and store the generated pixels when the FIFO buffer is enabled;

a display controller configured to retrieve the stored generated pixels from the FIFO buffer at a second clock rate when the FIFO buffer is enabled;

an error-checking circuit configured to receive the generated pixels at the first clock rate when the FIFO buffer is disabled, and compute an error-checking value corresponding to the received generated pixels; and a processing unit configured to disable the buffer to allow the error-checking circuit to receive the generated pixel at the first clock rate when performing error checking operations.

6. The video system of claim 5, wherein the display pipe is further configured to generate sets of pixels, each set of pixels of the sets of pixels representing a respective frame;

wherein the error-checking circuit is further configured to receive each set of pixels at the first clock rate when the FIFO buffer is disabled, and compute a respective error checking value corresponding to each received generated set of pixels.

7. The video system as recited in claim 5, wherein the display controller is further configured to provide the retrieved generated pixels to a display device at the second clock rate to display the retrieved generated pixels on the display device.

8. The video system as recited in claim 5, wherein the processing unit is further configured to disable the FIFO buffer responsive to detecting a fail condition of the display pipe.

9. A method for operating a graphics display system, the method comprising:

in a first mode of operation of the graphics display system:

generating, in a display pipe, first pixels corresponding to a first frame;

enabling a buffer for displaying the first pixels on a display device;

pushing the first pixels into the buffer; and retrieving the first pixels from the buffer and displaying the first pixels on a display device; and in a second mode of operation of the graphics display system:

disabling the buffer for performing error checking operations;

generating, in the display pipe, second pixels corresponding to a second frame;

computing an error-checking value using the second pixels at a rate unaffected by operation of the buffer, and determined by a rate at which the pixels are generated.

10. The method as recited in claim 9, wherein the second mode of operation precedes the first mode of operation.

11. The method as recited in claim 9, further comprising:

testing a functionality of the display pipe, comprising:

performing the disabling the buffer, the generating the second pixels, and the computing the error-checking value in the second mode of operation; and comparing the error-checking value to the expected value to detect a pass/fail condition of the display pipe.

12. The method as recited in claim 9, further comprising:

in the second mode of operation:

generating, in the display pipe, a plurality of pixels corresponding to a plurality of frames;

using the plurality of pixels to compute a respective error-checking value corresponding to each of the plurality of frames at a rate unaffected by operation of the buffer, and determined by a rate at which the plurality of pixels are generated; and compare each respective error value to a corresponding expected value to detect test pass/fail conditions.

13. The method as recited in claim 9, wherein the first frame and the second frame are the same.

14. A method comprising:

processing video pixels and image pixels in a display pipe at a first rate to generate a stream of pixels;

disabling a buffer configured to store video pixels and image pixels processed in the display pipe in order to perform error checking operations;

providing the stream of pixels to an error-checking circuit at the first rate;

computing, by the error checking circuit, an error-checking value from the stream of pixels;

comparing the error-checking value to an expected value to detect pass/fail conditions of the display pipe; and in response to detecting a pass condition of the display pipe:

enabling the buffer subsequent to comparing the error-checking value to the expected value.

15. The method of claim 14, further comprising:

a display controller reading the stored video pixels and image pixels from the buffer, and providing the stored video pixels and image pixels to a display device to display the stored video pixels and image pixels on the display device.

16. The method of claim 15, wherein the display controller reading and providing the stored video pixels and image pixels comprises the display controller reading and providing the stored video pixels and image pixels at a second rate lower than the first rate.

17. A system comprising:

system memory configured to store visual information comprising a set of pixels;

a display pipe configured to:

fetch the set of pixels from the system memory;

process the set of pixels to generate a stream of pixels; and output the stream of pixels;

a first-in-first-out (FIFO) buffer configured, when enabled, to receive and store the stream of pixels output by the display pipe;

a display controller configured to read the stored stream of pixels from the FIFO buffer when the FIFO buffer is enabled, and provide the read stream of pixels to a display device configured to display the read stream of pixels;

an error-checking circuit configured to:

receive the stream of pixels output by the display pipe at a rate at which the display pipe processes the set of pixels;

compute an error-checking value based on the received stream of pixels; and compare the error-checking value with an expected value to determine a pass/fail condition of the display pipe; and a processing unit configured to:

disable the FIFO buffer to allow the error-checking circuit to receive the stream of pixels output by the display pipe at the rate at which the display pipe processes the set of pixels; and enable the FIFO buffer to allow the FIFO buffer to store the stream of pixels output by the display pipe, responsive to the error-checking circuit determining a pass condition of the display pipe.

18. The system as recited in claim 17, wherein the processing unit is further configured to provide the expected value to the error-checking unit.

19. The system as recited in claim 17, wherein the display controller is configured to read the stored stream of pixels from the FIFO buffer at a rate commensurate with a refresh rate of the display device.

20. The system as recited in claim 17, wherein the visual information comprises a plurality of frames, and the stream of pixels corresponds to the plurality of frames;

wherein the error-checking circuit is further configured to compute respective error-checking values corresponding to the plurality of frames.

21. The system of claim 20, wherein error-checking circuit is further configured to compare the respective error-checking values to corresponding expected values to determine pass/fail conditions of the display pipe.

* * * * *